United States Patent [19]

Kyle

[11] 4,436,955

[45] Mar. 13, 1984

[54] TERMINAL ASSEMBLY

[76] Inventor: James C. Kyle, 2547 Fisher Rd., Roseburg, Oreg. 97470

[21] Appl. No.: 264,066

[22] Filed: May 15, 1981

[51] Int. Cl.[3] ...................... H01B 17/26; C03C 27/02; C03C 3/22

[52] U.S. Cl. ........................... 174/152 GM; 65/59.34; 65/59.35; 403/29; 403/30; 501/4; 501/15; 501/18; 501/75

[58] Field of Search ............... 174/50.58, 50.61, 50.63, 174/152 GM; 65/33, 36, 42, 59.1, 59.3, 59.31, 59.34, 59.35, 59.4, 59.5, 59.6; 228/122, 903; 403/28, 29, 30, 179

[56] References Cited

U.S. PATENT DOCUMENTS 3,278,211 10/1966 Baas et al. ............................ 403/29

OTHER PUBLICATIONS

Handen, C., "Glass-to-Metal Seals", *IBM Technical Disclosure Bulletin,* vol. 3, No. 5, Oct. 1960, pp. 37 and 38.

*Primary Examiner*—Laramie E. Askin

*Attorney, Agent, or Firm*—Ellsworth R. Roston; Charles H. Schwartz

[57] ABSTRACT

A terminal assembly includes a ferrule and a terminal pin disposed in spaced relationship to the ferrule. First layers made from a first ceramic insulating material are disposed in spaced relationship to each other in the space between the terminal pin and the ferrule. The layers are primarily polycrystalline but partially amorphous. Second layers made from a second ceramic insulating material are disposed in spaced relationship to each other in the space between the terminal pin and the ferrule and between the first layers. The second layers are fused to the terminal pin and the ferrule and the first layers. The second layers are primarily amorphous but partially polycrystalline. Layers of a third insulating material having relatively high characteristics of electrical insulation and having a lower melting temperature than the first and second layers may be respectively disposed at the opposite ends of the terminal assembly. The layers of the third insulating material are in fused relationship with the terminal pin and the ferrule and with the adjacent one of the first and second insulating materials.

23 Claims, 2 Drawing Figures

TERMINAL ASSEMBLY

Figure 1:
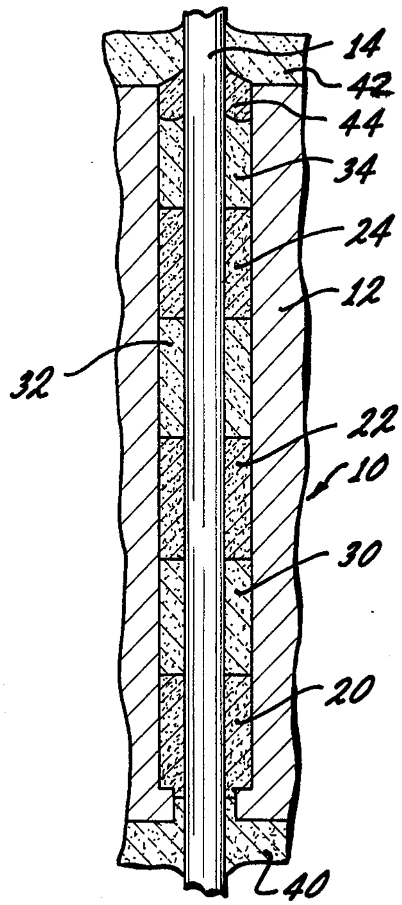

This invention relates to terminal assemblies and more particularly to terminal assemblies which are hermetically sealed and which are able to withstand considerable pressures at elevated temperatures without any degradation of the seals.

Many applications require terminal assemblies in which the components in the terminal assemblies are disposed in hermetically sealed relationship. Such terminal assemblies often have to be able to withstand considerable pressures at elevated temperatures without any degradation of the seals. For example, such terminal assemblies are required in the recovery of petroleum from beneath the surface of the earth. In such systems, the terminal assemblies are subjected to high temperatures and high pressures. As a result, the terminal assemblies now in use have only a limited life expectancy. Furthermore, when the terminal assemblies fail, it is difficult and expensive to replace the terminal assemblies because the pumping apparatus within the earth has to be withdrawn to a position above the earth where the proper replacement can be made.

A considerable effort has been devoted for an extended number of years to provide a terminal assembly which will be able to withstand considerable pressures at elevated temperatures such as occur in oil well installations. Such effort has also been devoted to provide a terminal assembly which will be able to provide optimum electrical insulation at such elevated temperatures and pressures. Such efforts have been particularly pronounced in recent years because of the high cost of generating energy. In spite of such efforts, relatively little progress has been made in providing satisfactory solutions to such problems.

This invention provides a terminal assembly which overcomes the above difficulties. The terminal assembly of this invention is hermetically sealed and is able to withstand considerable pressures at elevated temperatures without any degradation of such seal. For example, the terminal assembly is able to withstand a minimum of 50 pounds tensile pull on a terminal pin in the assembly at elevated temperatures as high as 1,000° F. without any degradation in the seal. The terminal assembly provides an electrical resistivity of 10,000 megohms at a high voltage such as 500 volts D.C. even at such elevated temperatures and pressures.

In one embodiment of the invention, a terminal assembly includes a ferrule and a terminal pin disposed in spaced relationship to the ferrule. First layers made from a first insulating material are disposed in spaced relationship to each other in the space between the terminal pin and the ferrule and are fused to the terminal pin and the ferrule. The layers are primarily polycrystalline.

Second layers made from a second insulating material are disposed in spaced relationship to each other in the space between the terminal pin and the ferrule and between the first layers. The second layers are fused to the terminal pin and the ferrule and the first layers. The second layers are primarily amorphous.

Layers of a third insulating material having relatively high characteristics of electrical insulation and having a lower melting temperature than the first and second layers may be respectively disposed at the opposite ends of the terminal assembly. The layers of the third insulating material are in fused relationship with the terminal pin and the ferrule and with the adjacent one of the first and second insulating materials.

Figure 2:
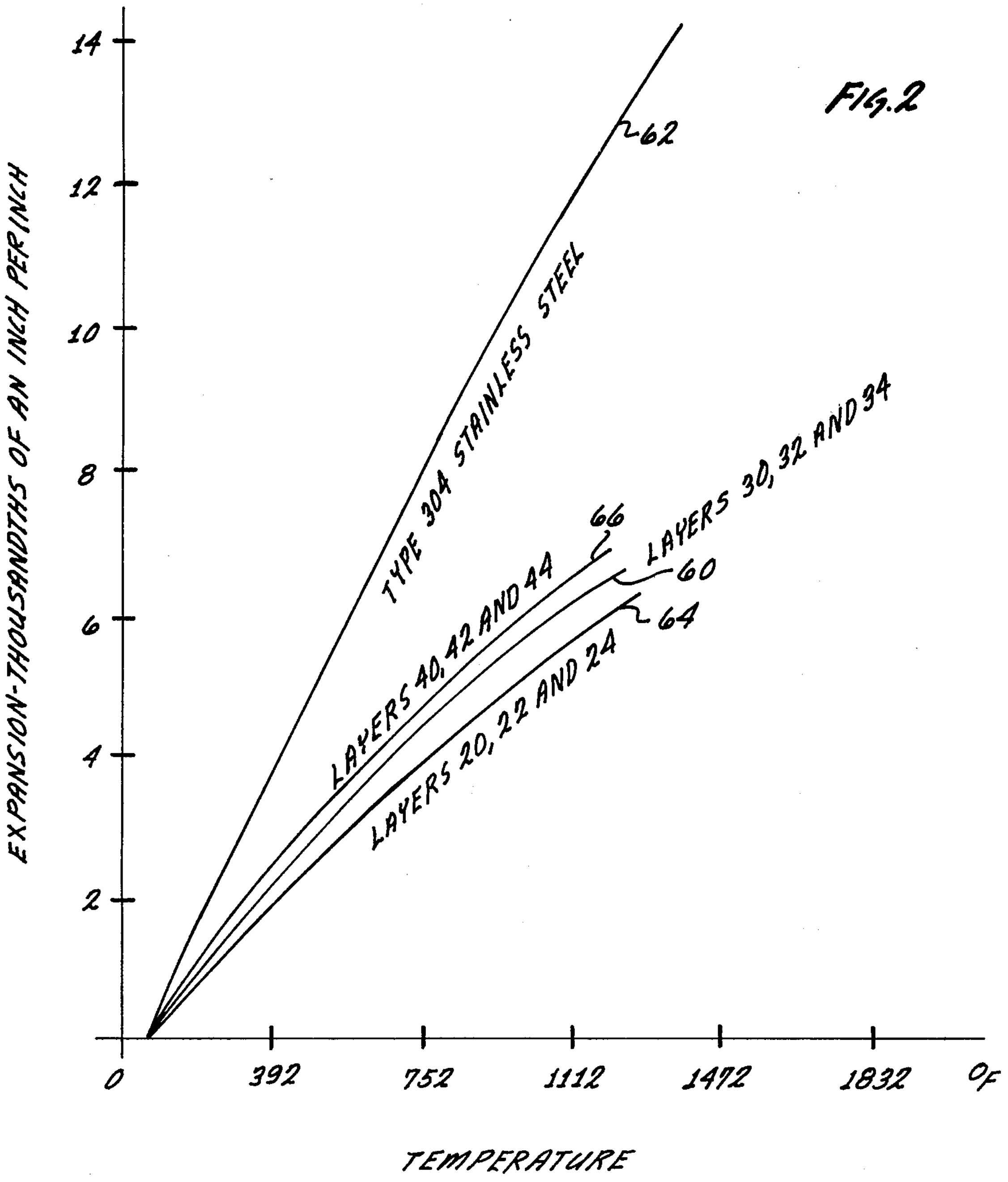

In the drawings:

FIG. 1 is a sectional view of a terminal assembly constituting one embodiment of the invention; and FIG. 2 illustrates the coefficient of thermal expansion of various members in the embodiment of FIG. 1 with changes in temperature.

In one embodiment of the invention, a terminal assembly generally indicated at 10 is provided. The terminal assembly 10 includes a ferrule such as a hollow sleeve 12 and a terminal pin 14 disposed in spaced relationship to the ferrule. When the ferrule is a hollow sleeve, the terminal pin 14 is disposed within the sleeve in spaced relationship to the sleeve. The sleeve 12 and the terminal pin 14 may be made from a suitable material such as "Inconel" or a stainless steel. Inconel has a composition including such metals as nickel, cobalt, vanadium and chromium.

First layers 20, 22 and 24 of a first insulating material are disposed in spaced relationship to one another in the space between the terminal pin 14 and the ferrule 12 and are fused to the terminal pin and the ferrule. The layers 20, 22 and 24 are primarily polycrystalline and have non-viscous properties even when subjected to such elevated temperatures as temperatures to 1,000° F. The layers 20, 22 and 24 are hard and are impervious to considerable forces such as a minimum of 50 pounds tensile pull on the terminal pin.

The insulating material constituting the layers 20, 22 and 24 fuses to the ferrule 12 and the terminal pin 14 at an elevated temperature such as approximately 1800° F. The insulating material provides a minimum electrical resistance of 10,000 megohms when subjected to a direct potential as high as 500 volts even at such considerable pressures.

Layers 30, 32 and 34 of a second insulating material are disposed in spaced relationship to one another in the space between the terminal pin and the ferrule and between the first layers 20, 22 and 24. The layers 30, 32 and 34 are fused to the terminal pin 14 and the ferrule 12 and to the adjacent ones of the layers 20, 22 and 24. The layers 30, 32 and 34 are primarily amorphous and are relatively viscous at elevated temperatures approaching 1,000° F. The insulating material constituting the layers 30, 32 and 34 has properties of maintaining a good hermetic seal with the ferrule 12 and the terminal pin 14 even when subjected to an elevated temperature such as approximately 1,000° F. for an extended period such as 48 hours.

In the areas of fusion between the layers 20, 22 and 24 and the layers 30, 32 and 34, the fused material constitutes a mixture of the insulating material forming the layers 20, 22 and 24 and the insulating material forming the layers 30, 32 and 34. This causes the mixture to have characteristics providing a composite of the characteristics of the insulating material defining the layers 20, 22 and 24 and the insulating material defining the layers 30, 32 and 34. Specifically, the fused material in the mixture is more crystalline than the insulating material in the layers 30, 32 and 34 but less crystalline than the insulating material in the layers 20, 22 and 24. Furthermore, the fused material in the mixture is able to withstand higher temperatures than the insulating material in the layers 20, 22 and 24 without any degradation of the seals with the ferrule 12 and the terminal pin 14.

The layers 20, 22 and 24 are alternately disposed with the layers 30, 32 and 34 in a stacked relationship between the ferrule 12 and the terminal pin 14. The beads defining the layers 20, 22 and 24 and the layers 30, 32 and 34 are then heated to an elevated temperature for a limited period of time. For example, the heating may be provided to a suitable temperature such as approximately 1600° F. for a limited period of time such as a period of approximately 30 minutes to produce the seal between the ferrule 12 and the terminal pin 14 and to produce the seal between the adjacent layers.

Covers 40 and 42 made from a suitable insulating material may be hermetically sealed to the terminal pin 14 and the ferrule 12 at the extremities of the terminal assembly 10. The covers 40 and 42 are provided with a fusing temperature less than that of any of the layers 20, 22 and 24 and the layers 30, 32 and 34. The covers 40 and 42 are advantageous because they significantly increase the length of the electrical leakage path between the ferrule 12 and the terminal pin 14 and accordingly increase significantly the electrical resistivity of the terminal assembly. The members 40 and 42 are further advantageous because they provide external seals for the terminal assembly.

An insulating layer 44 may be disposed between the layer 42 and the layer 34. The layer 44 may be provided with substantially the same characteristics as the layer 42 but may be provided with a slightly lower melting temperature than the layer 42. The layer 44 may be provided with substantially the same composition as the layer 42 so that it is compatible with the layer 42.

The insulating material for the layers 20, 22 and 24 may be produced as disclosed in co-pending application Ser. No. 111,787 filed by me on Jan. 9, 1980, for "Insulating Material, Method of Making Insulating Material and Assembly Incorporating Material." This application has been abandoned in favor of continuation application Ser. No. 322,014 filed Nov. 16, 1981. The insulating material for the layers 20, 22 and 24 may be formed from the following materials in the following relative amounts by weight:

| Material | Relative Amount by Weight |
|---|---|
| Lead oxide (preferably red lead) | 41.0 |
| Zinc oxide | 3.6 |
| Alumina (preferably calcined) | 1.8 |
| Silicon dioxide | 27.0 |
| Cerium oxide | 0.9 |
| Lanthanum oxide | 2.7 |
| Cobalt oxide | 1.4 |
| Sodium antimonate | 7.2 |
| Zinc zirconium silicate | 2.7 |
| Bismuth trioxide | 9.0 |
| Molybdenum trioxide | 2.7 (but as low as 0.5% by weight) |

Oxides selected from a group consisting of the oxides of chromium, nickel and manganese may be substituted for the oxide of cobalt. Oxides selected from a group consisting of the oxides of lithium and potassium may be substituted for the oxide of sodium. The oxide of lanthanum may be substituted for the oxide of cerium. A material such as zinc zirconium silicate may be substituted for the oxide of zinc. However, all of such substitutions may cause the properties of the resultant insulating material to deteriorate slightly from the properties of the material obtained from the mixture specified above.

The insulating material for the layers 20, 22 and 24 may be produced by a novel method. The different materials are initially weighted and milled and dried in a dry ball mill for an extended period of time such as approximately three (3) hours. The materials may then be placed in a mullite crucible preheated to a suitable temperature such as approximately 2200° F. The mixture may be heated in the preheated crucible at a suitable temperature such as a temperature of approximately 2200° F. for an extended period of time such as approximately six (6) hours. The mixture may thereafter be air cooled to a suitable temperature such as approximately 1000° F. The material may subsequently be heated in the mullite crucible to an elevated temperature such as approximately 2000° F. for an extended period such as approximately five (5) hours.

The smelted mixture may thereafter be fritted in deionized water and ground into particles in a suitable pulverizer which is non-contaminated. The particles may then be mixed with a suitable binder and may be pressed into beads which are then sintered at a suitable temperature such as approximately 1400° F. A suitable binder may be polyethylene glycol (marketed unde the name "carbowax") or an animal fat.

In the insulating material for the layers 20, 22 and 24, the oxides of lead, silicon, bismuth and sodium constitute glass formers. The oxides of cerium, lanthanum, zinc and zirconium produce crystallites. These crystallites have different sizes and shapes to enhance the ability of the insulating material to withstand different operating conditions. The amount of crystallites in the material may be in the order of eighty five percent (85%) to ninety percent (90%) and the remainder of the material may be amorphous. The amorphous portion may be dispersed somewhat uniformly throughout the insulating material.

The oxides of zinc and aluminum tend to increase the viscosity of the insulating material for the layers 20, 22 and 24. The oxide of aluminum also increases the melting temperature of the insulating material. In addition to producing crystallites, the oxide of cerium prevents the oxide of lanthanum from crystallizing too quickly or from crystallizing irregularly. As a result, the oxide of cerium is instrumental in providing homogeneity in the insulating material. The oxide of cobalt and the oxide of molybdenum enhance the bond of the insulating material to certain elements such as nickel, vanadium and chromium when the members 12 and 14 are made from a suitable material such as an "INCONEL" alloy. The oxide of bismuth tends to promote high surface resistivity, thereby increasing the electrical resistance of the material. The oxide of bismuth also tends to prevent lead from leaching out of the material.

The insulating material for the insulating layers 30, 32 and 34 may be produced as disclosed in a co-pending application Ser. No. 214,256 filed by me on Dec. 8, 1980, for "Insulating Material and Method of Making Material" (now U.S. Pat. No. 4,371,588). The insulating material for the layers 30, 32 and 34 may have the following composition:

| Material | Range of Percentages by Weight |
|---|---|
| Lead oxide (red lead) | 57-68 |
| Silicon dioxide | 23-32 |
| Soda ash (sodium carbonate) | 0.4-0.6 |
| Titanium dioxide | 3.2-3.9 |
| Zirconium oxide | 3.0-3.7 |
| Boric acid | 2.2-2.6 |

As is well known, silicon dioxide is a common material in glasses and ceramics. Lead oxide provides a considerable control over the melting temperature of the insulating material for the layers 30, 32 and 34 and also provides a considerable control over the characteristics of the coefficient of the thermal expansion of the insulating material. The lead oxide also controls the electrical resistivity of the insulating material for the layers 30, 32 and 34. The relative percentages of the silicon dioxide and the lead oxide in the insulating material for the layers 30, 32 and 34 tend to control the coefficient of thermal expansion of the material so that the changes in the coefficient of the thermal expansion of the material for the layers 30, 32 and 34 are matched to those of the members 12 and 14. The matching of such changes in the coefficients of thermal expansion is particularly enhanced because of the relatively high ratio of red lead to silicon dioxide in the insulating material for the layers 30, 32 and 34.

Boric acid acts as a glass former. It facilitates the production of at least a partially amorphous state in the insulating material for the layers 30, 32 and 34. Sodium carbonate is also a glass former. Since it is actually a powerful glass former, the relatively small amount of soda ash in the insulating material for the layers 30, 32 and 34 has a greater effect than the low percentage would indicate. Soda ash is especially helpful in providing the insulating material for the layers 30, 32 and 34 with substantially the same changes in the coefficient of thermal expansion as each of the members 12 and 14 when the members are made from stainless steel. Zirconium oxide and titanium dioxide are crystallites and insure that the insulating material is at least partially crystalline.

The insulating material for the layers 30, 32 and 34 may be formed by mixing the different materials in the particular ranges specified above and heating the mixture to a suitable temperature such as a temperature to approximately 1700° F. The mixture may then be maintained at this temperature for a suitable period of time such as a period to approximately three (3) hours. The material may then be quenched in a suitable liquid such as water and then ground and formed into beads.

The insulating material produced for the layers 30, 32 and 34 after the quenching operation is primarily amorphous but partially polycrystalline. The relative proportions in the amorphous and polycrystalline states of the insulating materials for the layers 30, 32 and 34 are somewhat independent of the temperatures and periods of time in which the mixture is heated. This is particularly true since the mixture tends to become partially amorphous and partially polycrystalline at the time that the mixture melts. As a result, the mixture may be melted repetitively without affecting simultaneously the properties of the material.

The insulating material for the layers 30, 32 and 34 has certain important and desirable properties. It is provided with a high electrical resistance such as a resistance in the order of $10^{14}$ to $10^{15}$ ohms. Its coefficient of thermal expansion also changes at progressive temperatures throughout an extended range (such as a range to approximately 1000° F.) at a rate matching the changes in the coefficient of thermal expansion of the members 12 and 14 throughout such range. This is particularly true when the members are made from titanium, titanium alloys, Inconel or stainless steels in the 300 series. Such matching changes in the coefficients of thermal expansion may be seen from FIG. 2, which illustrates at 60 the coefficient of thermal expansion of the material for the layers 30, 32 and 34 and at 62 the coefficient of thermal expansion of the members 12 and 14 when the members are made from stainless steel in the 300 series. FIG. 2 also illustrates at 64 the coefficient of thermal expansion of the material for the layers 20, 22 and 24.

As will be seen, the changes in the coefficients of thermal expansion of the members 12 and 14 and the material for the layers 30, 32 and 34 are matched substantially throughout a range of temperatures to approximately 1500° F. As a result, the material for the layers 30, 32 and 34 is able to maintain the hermetic seal with the members 12 and 14 throughout the extended range of temperatures to approximately 1500° F.

As will be appreciated, the compressive force exerted on the member 12 or on the member 14 by the material for the layers 30, 32 and 34 is dependent upon the difference in the coefficients of thermal expansion of such material and the members 12 and 14. Since the difference in the coefficients of thermal expansion remains substantially constant with changes in temperature, the compressive forces on the members 12 and 14 exerted by the material for the layers 30, 32 and 34 remain substantially constant with such changes in temperature. This facilitates the retention of the hermetic seal between the material for the layers 30, 32 and 34 and the members 12 and 14 with such change in temperature.

The percentage of the different oxides in the insulating material for the layers 30, 32 and 34 may be as follows to provide for an efficient sealing of the material to the members 12 and 14 when the members are made from stainless steel in the 300 series. For example, the insulating material for the layers 30, 32 and 34 may have the following composition:

| Material | Percentage by Weight |
|---|---|
| Lead oxide (red lead) | 64.9 |
| Silicon dioxide | 25.4 |
| Soda ash (sodium carbonate) | 0.5 |
| Titanium dioxide | 3.5 |
| Zirconium oxide | 3.3 |
| Boric acid | 2.4 |

When the insulating material for the layers 30, 32 and 34 has the composition specified above, its coefficient of thermal expansion throughout a range of temperatures to approximately 1500° F. changes at a rate which matches the changes in the coefficient of thermal expansion of stainless steel in the 300 series. For example, the coefficient of thermal expansion of the material for the layers 30, 32 and 34 may be approximately $4\times10^{-6}$ in/in/°F.

After being stacked between the members 12 and 14, the beads of the materials for the layers 20, 22 and 24 and for the layers 30, 32 and 34 and the members 12 and 14 are heated to an elevated temperature for a limited period of time. For example, the heating may be provided to a suitable temperature such as approximately 1600° F. for a limited period of time such as a period of approximately thirty (30) minutes to produce the seal between the member 12 and the insulating material for the layers 20, 22 and 24. Such heating simultaneously fuses the insulating material for the layers 30, 32 and 34 to the ferrule 12 and the terminal pin 14. A temperature of approximately 1600° F. is desirable because it constitutes the higher of the temperatures required to fuse the insulating materials to the members 12 and 14.

Beads defining the layers 20, 22 and 24 are alternately disposed with beads defining the layers 30, 32 and 34 in a stacked relationship between the ferrule 12 and the terminal pin 14. The stacked beads defining the layers 20, 22 and 24 and defining the layers 30, 32 and 34 are then heated to an elevated temperature for a limited period of time. For example, the heating may be provided to a suitable temperature such as approximately 1600° F. for a limited period of time such as a period of approximately 30 minutes to produce the seal between the ferrule 12 and the terminal pin 14 and to produce the seal between the adjacent layers of insulating material.

Covers 40 and 42 made from a suitable insulating material may be hermetically sealed to the terminal pin 14 and the ferrule 12 at the extremities of the terminal assembly 10. The covers 40 and 42 are provided with a fusing temperature less than that of any of the layers 20, 22 and 24 and the layers 30, 32 and 34. The covers 40 and 42 are advantageous because they significantly increase the length of the electrical leakage path between the ferrule 12 and the terminal pin 14 and accordingly increase significantly the electrical resistivity of the terminal assembly. The covers 40 and 42 are further advantageous because they provide external seals for the terminal assembly. For example, the covers 40 and 42 may have an electrical resistivity as high as $10^{18}$ ohms.

An insulating layer 44 may be disposed between the layer 42 and the layer 34. The layer 44 may be provided with substantially the same characteristics as the layer 42 but may be provided with a slightly lower melting temperature than the layer 42. The layer 44 may be provided with substantially the same composition as the layer 42 so that it is compatible with the layer 42.

The construction of, and method of, forming the covers 40 and 42 are fully disclosed in co-pending application Ser. No. 840,740 filed by me on Oct. 11, 1977, for a "Ceramic Material". This application has been abandoned in favor of continuation application Ser. No. 229,151 filed by me on Jan. 28, 1981. The covers 40 and 42 of this invention include a pair of fluxes having different melting temperatures. Preferably one of the fluxes has a melting temperature greater by several hundreds of degrees Fahrenheit, such as approximately 200° F. to 300° F. than the other flux. By way of illustration, one of the fluxes (Flux A) may have a melting temperature of approximately 800° F. and a composition for the members 40 and 42 as follows:

| Material | Relative Percentage by Weight |
|---|---|
| Lead oxide (PbO) | 68.5 |
| Boric oxide ($B_2O_3$) | 10.5 |
| Silicon dioxide ($SiO_2$) | 21.0 |

The other flux (Flux B) may have a melting temperature of approximately 1000° F. and a composition as follows for the covers 40 and 42:

| Material | Relative Percentage by Weight |
|---|---|
| Lead oxide (PbO) | 80.0 |
| Boric oxide ($B_2O_3$) | 20.0 |

Fluxes A and B tend to constitute eutectics which effectively lower the melting point of the boric oxide in the fluxes.

When fluxes A and B are provided as specified above, flux A may have a relative percentage by weight in the material of approximately fifteen percent (15%) to twenty-five percent (25%) and flux B may have a relative percentage by weight in the material of approximately forty percent (40%) to fifty-five percent (55%). A stuffing material having properties of becoming crystalline is also provided in the material in a percentage by weight of approximately twenty percent (20%) to forty-five percent (45%).

The crystal stuffing for the covers 40 and 42 includes oxides of zinc and zirconium and silicon dioxide to provide for the formation of crystals in at least a portion of the material. The oxides of zinc and zirconium and the silicon dioxide may be included in such forms as zinc zirconium silicate, zirconium spinel and zirconium silicate. For example, the crystal stuffing may be formed from the following materials in the following percentages by weight:

| Material | Relative Parts by Weight |
|---|---|
| Lead antimonate ($Pb_3(SbO_4)_2)_2$ composed of lead, antomony and oxygen | 2 |
| Zinc zirconium silicate | 1 |
| Zirconium spinel | 1 |
| Zirconium silicate | 1 |

To form the material for the covers 40 and 42 of this invention and to produce hermetic seals with such material, fluxes A and B are first smelted separately and quenched in water to frit the material. For example, flux A may be smelted for a period of approximately two (2) hours at a temperature of approximately 1500° F. and then quenched in water, and flux B may be smelted for a period of approximately one (1) hour at a temperature of approximately 1200° F. and then quenched in water. The crystal stuffing is smelted for a period of approximately three (3) hours at a temperature of approximately 1800° F. and is then quenched in water.

The fritted fluxes and the crystal stuffing are then mixed in the desired percentages and ground such as in a ball mill for a period of approximately three (3) to four (4) hours. The material is then heated to a temperature of approximately 1200° F. for a period of approximately two (2) to three (3) hours. Preferably the material is stirred periodically such as every fifteen (15) minutes while it is being heated. The temperatures and times chosen for such heating operation are such as to partially combine the different compounds in the mixture. As a result, the material is predominately amorphous but a portion has become crystalline. For example, approximately eighty percent (80%) of the material may be amorphous and approximately twenty percent (20%) may be crystalline. The material is then converted to a frit by quenching in water. The resultant material has a melting temperature of approximately 1100° F.

The material for the covers 40 and 42 is then heated to a temperature slightly above its melting temperature for a period of time dependent upon the characteristics desired for the material. For example, the material may be heated to a temperature of approximately 1200° F. (100° F. above the melting temperature) for a period of approximately three (3) to four (4) hours. The material slowly changes from an amorphous glass to a ceramic as it is being heated.

The temperature and duration of the heating operation are chosen so that the coefficient of thermal expansion of the material is slightly greater than the coefficient of thermal expansion of the member, such as the ferrule 12 or the terminal pin 14, to be sealed. The temperature and duration of the heating operation are such that the material is approximately fifty percent (50%) amorphous and approximately fifty percent (50%) crystalline or slightly more crystalline than amorphous.

The fritted material is then pulverized and separated into different sizes. Beads are then formed by mixing particles of different sizes with a suitable material such as polyethylene glycol (marketed under the name "Carbowax") or an animal fat and pressing the particles together. For example, approximately forty percent (40%) of particles by weight of 150 mesh, approximately fifty percent (50%) of particles of 300 mesh and approximately ten percent (10%) of particles above 300 mesh may be mixed with polyethylene glycol or an animal fat where the polyethylene glycol or the animal fat comprises one and one-half percent (1.5%) to three percent (3) by weight in the mixture. The particles may then be pressed together to form the beads.

The beads are then disposed between the terminal pin 14 and the ferrule 12. The combination is then heated to a suitable temperature such as approximately 1225° F. for a suitable period of time such as a period to approximately thirty (30) minutes. The material then becomes fused to the terminal pin 14 and the ferrule 12. Since the combination is heated for only a relatively short period of time, the crystal structure of the material for the covers 40 and 42 is not changed significantly during the heating operation.

The fusion of the covers 40 and 42 to the ferrule 12 and the terminal pin 14 is facilitated by cooling the material rapidly in air. This causes the material in the member 40 to press against the ferrule 12 and the terminal pin 14 as it is rapidly cooled, particularly since the coefficient of thermal expansion of the material is slightly greater than that of the ferrule 12 and the terminal pin 14. By pressing against the ferrule 12 and the terminal pin 14 during such cooling, the material facilitates the production of a hermetic seal with the ferrule.

The hermetic seals between the covers 40 and 42 and the ferrule 12 and between the covers 40 and 42 and the terminal pin 14 are produced in various ways. For example, a thin polycrystalline layer is produced in the covers 40 and 42 at the boundaries with the ferrule 12 and the terminal pin 14. For example, zinc silicate ($Zn_2SiO_4$) or a relatively complex compound of zinc, oxygen and silicon ($2ZnO.SiO_2$) having the same chemical composition as zine silicate or a combination of both is formed at such boundary. These crystals tend to become formed in the presence of lead or antimony. These zinc compounds become crystallized in the form of Willemite crystals. Furthermore, crystals of zirconium silicate also become produced at such boundary.

The crystallization of the zirconium silicate occurs in the presence of lead. The crystallization of the zirconium silicate is facilitated by the inclusion of zinc zirconium silicate in the mixture since this compound tends to become dissolved at a lower temperature than zirconium silicate. Zinc zirconium silicate and zirconium silicate tend to exist as natural minerals and are preferably used in this form.

The Willemite crystals are of a different size and shape than the crystals of zirconium silicate. For example, the crystals of zirconium silicate tend to be smaller than the Willemite crystals. This causes nucleations of different sizes to be produced and facilitates the flexing and bending of the crystal layer adjacent the ferrule when subjected to thermal and mechanical shocks. In this way, the hermetic seal is maintained even when the material is subjected to severe thermal or mechanical shocks.

Zirconium spinel tends to increase the mechanical strength of the material. When introduced into the material, zirconium spinel is already in crystalline form so that it does not change as the material is heated and cooled as specified above. As a result, zirconium spinel acts as a filler in the material. Zirconium spinel tends to exist as a natural mineral and is preferably used in this form.

As oxygen valence bond is also produced between the covers 40 and 42 and the ferrule 12 and between the covers 40 and 42 and the terminal pin 14 to facilitate the formation of a hermetic seal between them. This oxygen valence bond results from a chemical bond between oxygen atoms in the material and atoms on the surface of the ferrule 12 and the terminal pin 14. In other words, the oxygen is shared by the layer on the surface of the ferrule 12 and the covers 40 and 42 and the layer on the surface of the terminal pin 14 and the covers. This oxygen valence bond is produced during the heating of the material and the ferrule and the terminal pin to the relatively high temperatures.

The material constituting the covers 40 and 42 also provides other advantages of some importance. For example, the material constituting the covers 40 and 42 provides a high dielectric constant considerably greater than that of most other materials now in use. By way of illustration, the electrical insulation provided by the covers 40 and 42 between the terminal pin 14 and the ferrule 12 is as high as $10^{18}$ ohms. This is important in such equipment as heart pacemakers which have to operate satisfactorily under all of the adverse sets of circumstances which a human body is capable of producing.

The material constituting the covers 40 and 42 also has other advantages of some importance. For example, when the operation of hermetically sealing the terminal pin 14 and the ferrule 12 has been completed, tests are made to determine if a hermetic seal has actually been produced. If a hermetic seal has not been produced, the combination of the terminal pin, the ferrule and the covers 40 and 42 may be fused at the temperature of approximately 1200° F. for an additional period to approximately thirty (30) minutes. Since the material constituting the covers 40 and 42 is still somewhat amorphous, this additional fusing operation tends to facilitate the creation of the oxygen valence bond between the material and the ferrule and between the material and the terminal pin. It also tends to facilitate the creation of a polycrystalline structure in the material, particularly at the surface adjacent the ferrule. As a result, any failure to produce a hermetic seal tends to become corrected.

The covers 40 and 42 may be respectively provided with the following compositions:

| Material | Relative Amounts in Mixture |
|---|---|
| Zirconium silicate | 6.8 |
| Zinc zirconium silicate | 3.4 |
| Boric acid | 14.0 |
| Zirconium spinel | 3.4 |
| Red lead | 61.3 |
| Bismuth Trioxide | 6.8 |

-continued

| Material | Relative Amounts in Mixture |
| --- | --- |
| Quartz | 4.3 |

The fusing temperature of this composite material is approximately 1200° F.

An additional insulating layer 44 may be provided between the layer 42 and the layer 34. The layer 44 may be provided with the same composition as the layer 42 except that it does not include any silicon dioxide. The layer 44 may be formed by substantially the same method as that described above for the layer 42. However, the layer 44 may have a melting temperature of approximately 1160° F.

FIG. 2 illustrates at 66 the coefficient of thermal expansion of the layers 40, 42 and 44. As will be seen, the layers 40, 42 and 44 have a coefficient of thermal expansion which changes, with changes in temperature, at a rate more closely approximating the change in the rate of thermal expansion of stainless steel than the coefficients of thermal expansion of the layers 20, 22 and 24 and the layers 30, 32 and 34. It also changes at a rate, with changes in temperature, substantially corresponding to the changes in the rate of changes of the materials in the layers 20, 22 and 24 and 30, 32 and 34 with changes in temperature.

As used in the claims, the term "terminal pin" is intended to mean any type of member, preferably electrically conductive. As used in the claims, the term "ferrule" is intended to mean any member, preferably electrically conductive, disposed in spaced relationship to the terminal pin.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination,
a ferrule,
a terminal pin disposed in spaced relationship to the ferrule,
first layers made from a first ceramic insulating material and disposed in spaced relationship to one another in the space between the terminal pin and the ferrule and fused to adjacent ones of the terminal pin and the ferrule, the first ceramic insulating material being primarily polycrystalline but partially amorphous,
second layers made from a second ceramic insulating material and disposed in spaced relationship to one another in the space between the terminal pin and the ferrule and between the first layers and fused to adjacent ones of the terminal pin and the ferrule and the first layers, the second ceramic insulating material being primarily amorphous but partially polycrystalline.

2. The combination set forth in claim 1 wherein
the first ceramic insulating material is non-viscous at elevated temperatures and the second ceramic insulating material is viscous at elevated temperatures.

3. The combination set forth in claim 2 wherein
the first layers have areas of fusion with the second layers and wherein the ceramic insulating material in the areas of fusion is more crystalline than the second ceramic insulating material and less crystalline than the first ceramic insulating material.

4. The combination set forth in claim 2, including,
a third layer of a third ceramic material disposed at one end of the ferrule and covering that end of the ferrule,
the third ceramic insulating material being hermetically sealed to the terminal pin and the ferrule and to a first layer of one of the first and second ceramic insulating materials, and
a fourth layer of a fourth ceramic material disposed at the opposite end of the ferrule and covering the opposite end of the ferrule, the fourth ceramic insulating material being hermetically sealed to the terminal pin and the ferrule and to a second layer of one of the first and second ceramic insulating materials.

5. The combination set forth in claim 4 wherein
the third and fourth ceramic insulating materials have lower melting temperatures than the first and second ceramic insulating materials.

6. The combination set forth in claim 5 wherein
the melting temperature of the third ceramic insulating material is lower than the melting temperature of the fourth ceramic insulating material.

7. The combination set forth in claim 1, including,
third layers of a third ceramic insulating material hermetically sealed to adjacent ones of the ferrule and the terminal pin and the layers of the first and second insulating materials and providing an enhanced electrical resistivity between the terminal pin and the ferrule.

8. In combination,
a ferrule,
a terminal pin disposed in spaced relationship to the ferrule,
first layers made from a first insulating material and disposed in spaced relationship to each other in the space between the terminal pin and the ferrule and fused to adjacent ones of the terminal pin and the ferrule, the first insulating material being primarily polycrystalline,
second layers made from a second insulating material and disposed in spaced relationship to each other in the space between the first layers and fused to adjacent ones of the terminal pin and the ferrule and the first layers, the second insulating materials being primarily amorphous,
first and second layers of a third insulating material having relatively high characteristics of electrical insulation and having a lower melting temperature than the first and second insulating materials, the first and second layers of the third insulating material being respectively disposed at the opposite ends of the terminal assembly in fused relationship with adjacent ones of the terminal pin and the ferrule and the first and second insulating materials.

9. In combination,
a ferrule,
a terminal pin disposed in spaced relationship to the ferrule,
first layers made from a first ceramic insulating material and disposed in spaced relationship to one another in the space between the terminal pin and the ferrule and fused to adjacent ones of the terminal pin and the ferrule, the first ceramic insulating material having properties of withstanding considerable pressures without any deterioration in the fused relationship with the terminal pin and the ferrule, and second layers made from a second ceramic insulating material and disposed in spaced relationship in the space between the terminal pin and the ferrule and between the first layers and fused to adjacent ones of the terminal pin and the ferrule and the first layers, the second ceramic insulating material having properties of withstanding elevated temperatures without any deterioration in the fused relationship with the terminal pin and the ferrule.

10. The combination set forth in claim 9 wherein the first and second layers of ceramic insulating material are disposed in alternately stacked relationship and the areas between the first and second layers have characteristics constituting a composite of the characteristics of the first and second insulating materials.

11. The combination set forth in claim 10 wherein the first ceramic insulating material is formed from the following materials in the following relative amounts by weight:

| Material | Relative Amount By Weight |
|---|---|
| Cobalt oxide | 1.4 |
| Zinc zirconium silicate | 2.7 |
| Calcined alumina | 1.8 |
| Zinc oxide | 3.6 |
| Red lead | 41.0 |
| Cerium oxide | 0.9 |
| Lanthanum oxide | 2.7 |
| Sodium Antimonate | 7.2 |
| Molybdenum trioxide | 2.7 |
| Bismuth trioxide | 9.0 |
| Silicon dioxide | 27.0 |

12. The combination set forth in claim 10 wherein the second ceramic insulating material is formed from the following materials in the following relative amounts by weight:

| Material | Relative Amount By Weight |
|---|---|
| Zirconium oxide | 3.3 |
| Titanium oxide | 3.5 |
| Boric oxide | 2.4 |
| Sodium carbonate | 0.5 |
| Red lead | 64.9 |
| Silicon dioxide | 25.4 |

13. The combination set forth in claim 10 wherein the first ceramic insulating material is non-viscous even at elevated temperatures and the second ceramic insulating material is viscous at the elevated temperatures.

14. The combination set forth in claim 9 wherein the first ceramic insulating material is partially amorphous but primarily polycrystalline and the second ceramic insulating material is partially polycrystalline but primarily amorphous.

15. In combination, a terminal pin, a ferrule disposed in spaced relationship to the terminal pin, and a plurality of layers of ceramic insulating material disposed in stacked relationship, each layer being fused to an adjacent one of the other layers and the terminal pin and the ferrule, first alternate layers being primarily polycrystalline but partially amorphous and second alternate layers being primarily amorphous but partially polycrystalline.

16. The combination set forth in claim 15 wherein, the first alternate layers are non-viscous and the second alternate layers are viscous and the first alternate layers are able to withstand considerable pressures without any deterioration in the fusion characteristics and the second alternate layers are able to withstand elevated temperatures without any deterioration in the fusion characteristics.

17. The combination as set forth in claim 15, including, a first ceramic insulating cover at one end of the terminal assembly, and a second ceramic insulating cover at the opposite end of the terminal assembly, the first and second ceramic insulating covers having a lower melting temperature than the first and second layers.

18. The combination set forth in claim 17 wherein each of the first and second covers is made from the following materials in the following relative percentages by weight:

| Materials | Relative Percentages By Weight |
|---|---|
| Zirconium silicate | 6.8 |
| Zinc zirconium silicate | 3.4 |
| Boric oxide | 14.0 |
| Zirconium spinel | 3.4 |
| Red lead | 61.3 |
| Bismuth trioxide | 6.8 |
| Zilicon dioxide | 4.3 |

19. The combination set forth in claim 17 including, an additional ceramic insulating layer between the first cover and the layers of ceramic insulating material in the plurality and provided with a lower melting temperature than the first cover, the additional ceramic insulating layer having substantially the same composition as the first cover.

20. In combination, a terminal pin, a ferrule disposed in spaced relationship to the terminal pin, and a plurality of layers of ceramic insulating material disposed in stacked relationship, each layer being fused to the adjacent ones of the terminal pin, the ferrule and the other layers in the plurality, first alternate layers being primarily polycrystalline but partially amorphous and second alternate layers being primarily amorphous but partially polycrystalline.

21. The combination set forth in claim 20 wherein the first ceramic insulating material is non-viscous and the second ceramic insulating material is viscous.

22. The combination set forth in claim 20 wherein the areas of fusion between the first and second ceramic insulating materials have properties constituting a combination of the properties of the first and second ceramic insulating materials.

23. The combination set forth in claim 22, including, a third layer of ceramic insulating material covering the first and second layers of ceramic material and the ferrule and having a lower melting temperature than the melting temperatures of the first and second layers and providing an enhanced electrical resistivity between the terminal pin and the ferrule.

* * * * *